(12) United States Patent
Shigeta et al.

(10) Patent No.: US 9,020,723 B2
(45) Date of Patent: Apr. 28, 2015

(54) DRIVING FORCE DISTRIBUTION CONTROLLER AND FOUR-WHEEL DRIVE VEHICLE

(75) Inventors: Ryohei Shigeta, Anjo (JP); Akiyoshi Kakita, Toyota (JP); Masaki Mita, Chiryu (JP); Akira Kodama, Chiryu (JP); Yasushi Yagi, Hiroshima (JP)

(73) Assignees: JTEKT Corporation, Osaka-shi (JP); Mazda Motor Corporation, Aki-gun (JP)

( * ) Notice: Subject to any disclaimer, the term of this patent is extended or adjusted under 35 U.S.C. 154(b) by 58 days.

(21) Appl. No.: 14/008,803

(22) PCT Filed: Mar. 19, 2012

(86) PCT No.: PCT/JP2012/057020
§ 371 (c)(1),
(2), (4) Date: Dec. 23, 2013

(87) PCT Pub. No.: WO2012/132996
PCT Pub. Date: Oct. 4, 2012

(65) Prior Publication Data
US 2014/0129105 A1    May 8, 2014

(30) Foreign Application Priority Data
Mar. 31, 2011    (JP) ................. 2011-080042

(51) Int. Cl.
*G06F 7/00*    (2006.01)
*G06F 17/00*    (2006.01)
(Continued)

(52) U.S. Cl.
CPC ............... *B60K 17/348* (2013.01); *B60K 17/35* (2013.01); *B60K 23/0808* (2013.01); *B60W 30/18* (2013.01); *B60W 2510/0638* (2013.01); *B60W 2520/10* (2013.01); *B60W 2520/263* (2013.01); *B60W 2720/403* (2013.01)

(58) Field of Classification Search
CPC ... B60K 17/35; B60K 17/348; B60K 23/0808
USPC ......................................................... 701/69
See application file for complete search history.

(56) References Cited

U.S. PATENT DOCUMENTS

2004/0168846 A1    9/2004    Maekawa et al.

FOREIGN PATENT DOCUMENTS

JP    63 180521    7/1988
JP    2004 189228    7/2004

(Continued)

OTHER PUBLICATIONS

U.S. Appl. No. 14/102,763, filed Dec. 11, 2013, Mita, et al.
International Search Report Issued Jun. 19, 2012 in PCT/JP12/57020 Filed Mar. 19, 2012.

*Primary Examiner* — Maceeh Anwari
(74) *Attorney, Agent, or Firm* — Oblon, McClelland, Maier & Neustadt, L.L.P.

(57) ABSTRACT

A driving force distribution controller comprises: a control device determining the value of torque which must be transmitted to a rear wheel; and a driving force transmission device transmitting torque corresponding to the torque value determined by the control device to the rear wheel. The control device reduces a torque value calculated based on an opening degree of an accelerator and a rotational speed difference when the rotational speed of an engine is lower than a first threshold value but higher than a second threshold value.

20 Claims, 5 Drawing Sheets

(51) Int. Cl.
  *G06F 19/00* (2011.01)
  *B60K 17/348* (2006.01)
  *B60K 17/35* (2006.01)
  *B60K 23/08* (2006.01)
  *B60W 30/18* (2012.01)

(56) References Cited

FOREIGN PATENT DOCUMENTS

| | | |
|---|---|---|
| JP | 2004 262321 | 9/2004 |
| JP | 2004 306802 | 11/2004 |
| JP | 3823072 | 6/2006 |

DRIVING FORCE DISTRIBUTION CONTROLLER AND FOUR-WHEEL DRIVE VEHICLE

TECHNICAL FIELD

The invention relates to a driving force distribution controller capable of controlling a transmission torque to auxiliary drive wheels, and a four-wheel drive vehicle provided with the driving force distribution controller.

BACKGROUND ART

There is a conventional front-and-rear wheel drive vehicle in which a driving force of an engine is transmitted to front wheels as main drive wheels on a constant basis and is transmitted to rear wheels as auxiliary drive wheels at the time of need depending on a running condition of a vehicle (see, e.g., PTL 1).

The front-and-rear wheel drive vehicle disclosed in PTL 1 is provided with a driving force transmission device for transmitting a driving force output from the engine to the auxiliary drive wheels and has a function of controlling torque to be transmitted to the auxiliary drive wheels based on a throttle opening degree or a difference in rotation between front and rear wheels.

CITATION LIST

Patent Literature

[PTL 1]
Japanese patent No. 3823072

SUMMARY OF INVENTION

Technical Problem

In the meantime, vehicles in recent years are required to be light in weight for the purpose of improvement in fuel efficiency, etc. Meanwhile, each structural member of a driving force transmission system has different necessary support stiffness depending on a torque transmission direction which is switched based on an acceleration mode or a deceleration mode. It is therefore considered that support stiffness during deceleration, in which the upper limit of necessary torque is smaller than that during acceleration, is decreased than support stiffness during acceleration so as to reduce weight of a support member or to simplify a support structure.

However, in, e.g., a so-called manual transmission vehicle mounting a manual transmission (manual gearbox), when a driver releases a clutch between an engine and a transmission by depressing a clutch pedal while the vehicle is moving and the clutch is then engaged suddenly in a state that an engine speed is low due to release of an accelerator pedal, torque transmission to the auxiliary drive wheels is carried out according to the vehicle speed even in the state that the accelerator pedal is released and this may cause large torque in a direction of deceleration to be generated in the driving force transmission system.

In conventional four-wheel drive vehicles, in order to sufficiently withstand the maximum torque in the direction of deceleration which can be generated in case of such an operation, it is necessary to ensure support stiffness or strength of a driving force transmission member for transmitting a driving force to auxiliary drive wheels.

Therefore, it is an object of the invention to provide a driving force distribution controller and a four-wheel drive vehicle that are able to reduce the maximum torque generated in the direction of deceleration at a driving force transmission member transmitting a driving force to auxiliary drive wheels.

Solution to Problem

In order to achieve the above-mentioned object, the present invention provides a driving force distribution controller and a four-wheel drive vehicle in [1] to [8].

[1] A driving force distribution controller that is mounted on a four-wheel drive vehicle comprising an engine for generating a driving force, a gearbox for changing output speed of the engine, a clutch capable of interrupting torque transmission between the engine and the gearbox, and a driving force transmission system capable of transmitting an output of the gearbox to either front or rear wheels as main drive wheels and to other remaining wheels as auxiliary drive wheels, the driving force distribution controller comprising: a control device that calculates a command torque value to be transmitted to the auxiliary drive wheels; and a driving force transmission device that transmits torque corresponding to the command torque value to the auxiliary drive wheels, wherein the control device comprises: a first control means that calculates a torque value to be transmitted to the auxiliary drive wheels according to a running condition; and a second control means that determines the torque value calculated by the first control means to be the command torque value when a rotational speed of the engine is not lower than a first threshold value or when a vehicle speed is not higher than a second threshold value, and that reduces the torque value calculated by the first control means and determines the reduced torque value to be the command torque value when the rotational speed of the engine is lower than the first threshold value and when the vehicle speed is higher than the second threshold value.

[2] The driving force distribution controller described in [1], wherein the second control means reduces the torque value calculated by the first control means when the rotational speed of the engine is lower than the first threshold value, when the vehicle speed is higher than the second threshold value and when the amount of acceleration operation by a driver is smaller than a third threshold value.

[3] The driving force distribution controller described in [1] or [2], wherein the front wheels comprise a left front wheel and a right front wheel, and the rear wheels comprise a left rear wheel and a right rear wheel, the controller further comprising: a wheel speed sensor for the left front wheel to detect a rotational speed of the left front wheel; a wheel speed sensor for the right front wheel to detect a rotational speed of the right front wheel; a wheel speed sensor for the left rear wheel to detect a rotational speed of the left rear wheel; and a wheel speed sensor for the right rear wheel to detect a rotational speed of the right rear wheel, wherein the rotational speed of the front wheels is calculated from an average of a detected value of the rotational speed of the left front wheel and that of the right front wheel, wherein the rotational speed of the rear wheels is calculated from an average of a detected value of the rotational speed of the left rear wheel and that of the right rear wheel, wherein a rotational speed difference is calculated by subtraction between the rotational speed of the front wheels and that of the rear wheels, and wherein the first control means calculates a torque value to be transmitted to the auxiliary drive wheels based on at least the rotational speed difference.

[4] The driving force distribution controller described in any one of [1] to [3], mounted on the four-wheel drive vehicle that the front wheels are used as the main drive wheels and the rear wheels are used as the auxiliary drive wheels.

[5] The driving force distribution controller described in any one of [1] to [4], wherein the first threshold value is from 1000 to 2000 rpm and the second threshold value is from 10 to 20 km/h.

[6] The driving force distribution controller described in any one of [1] to [5], wherein the driving force transmission system comprises a differential device arranged between the driving force transmission device and the auxiliary drive wheels, and wherein the control device decreases the reduction amount of the torque value according to an increase in temperature of differential oil in a differential carrier that houses the differential device.

[7] The driving force distribution controller described in any one of [1] to [5], wherein the control device decreases the reduction amount of the torque value according to an increase in outside temperature.

[8] A four-wheel drive vehicle, comprising: an engine for generating a driving force; a gearbox for changing output speed of the engine; a clutch capable of interrupting torque transmission between the engine and the gearbox; a driving force transmission system capable of transmitting an output of the gearbox to either front or rear wheels as main drive wheels and to other remaining wheels as auxiliary drive wheels; and the driving force distribution controller described in any one of [1] to [7].

Advantageous Effects of Invention

According to the invention, it is possible to reduce the maximum torque in a direction of deceleration generated in a driving force transmission member which transmits a driving force to auxiliary drive wheels.

In addition, according to the invention, since it is possible to reduce the maximum torque in the direction of deceleration generated in the driving force transmission member, it is possible to ensure reliability of each component of a driving force transmission system while improving fuel efficiency by weight reduction (simplification) of a support structure of such each component.

DESCRIPTION OF EMBODIMENTS

First Embodiment

Figure 1:
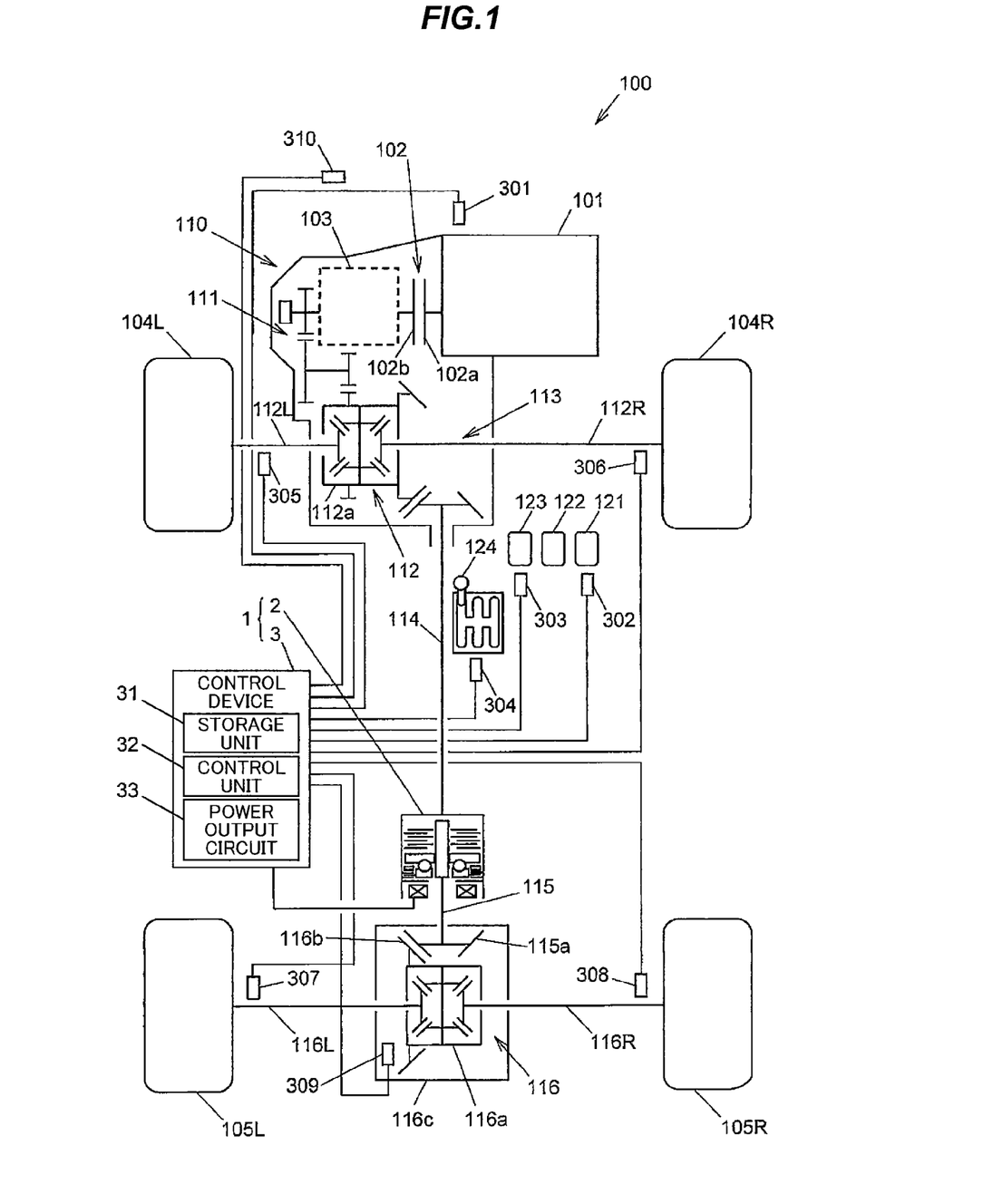
FIG. 1 is a schematic view showing a configuration example of a four-wheel drive vehicle in a first embodiment of the present invention.

FIG. 1 is a schematic view showing a configuration example of a four-wheel drive vehicle in the first embodiment of the invention. As shown in FIG. 1, a four-wheel drive vehicle 100 mounts an engine 101 as a drive source, a transmission 103 as a gearbox for changing output speed of the engine 101, a clutch 102 capable of interrupting torque transmission between the engine 101 and the transmission 103, and a driving force transmission system 110 which transmits an output of the transmission 103 to right and left front wheels 104 (a left front wheel 104L and a right front wheel 104R) and to a driving force distribution controller 1 as well as to right and left rear wheels 105 (a left rear wheel 105L and a right rear wheel 105R). The driving force distribution controller 1 is switchable between a two-wheel drive mode and a four-wheel drive mode, and is composed of a driving force transmission device 2 capable of adjusting transmission torque and a control device 3 which controls the driving force transmission device 2.

In addition, an accelerator pedal 121, a brake pedal 122, a clutch pedal 123 and a shift lever 124 by which a driver carries out an operation are arranged in a cabin of the four-wheel drive vehicle 100.

The engine 101 is an internal-combustion engine supplied with fuel in an amount corresponding to an amount of depression of the accelerator pedal 121, and generates a driving force for running the four-wheel drive vehicle 100.

The clutch 102 is, e.g., a dry clutch which transmits torque by frictional pressure-contact between a pair of rotating members. The clutch 102 has a first disk 102a on the engine 101 side and a second disk 102b arranged on the transmission 103 side so as to be relatively rotatable with respect to the first disk 102a.

When the driver depresses the clutch pedal 123, the first disk 102a is separated from the second disk 102b and torque transmission by the clutch 102 is interrupted. Meanwhile, a pressure-contact force between the first disk 102a and the second disk 102b increases with a decrease in an amount of depression of the clutch pedal 123, the two disks frictionally slide, and torque transmitted from the engine 101 to the transmission 103 is increased.

The transmission 103 is a manual gearbox which allows a driver to change a gear ratio to several speeds by gear shift operation of the shift lever 124. The transmission 103 is, e.g., a 5-speed transmission which allow a gear ratio to be changed to five speeds (during forward movement) from the $1^{st}$ speed to $5^{th}$ speed. In addition, the transmission 103 can provide a neutral mode in which a driving force of the engine 101 is not transmitted to the driving force transmission system 110.

(Structure of Driving Force Transmission System)

The driving force transmission system 110 is provided with a front differential device 112 for distributing torque to the left front wheel 104L and the right front wheel 104R, a first gear mechanism 111 for transmitting an output of the transmission 103 to a differential case 112a of the front differential device 112, a propeller shaft 114, a second gear mechanism 113 connecting the differential case 112a to the propeller shaft 114, a pinion gear shaft 115 to which torque of the propeller shaft 114 is transmitted via the driving force transmission device 2 of the driving force distribution controller 1, and a rear differential device 116 by which the torque transmitted to the pinion gear shaft 115 is distributed to the left rear wheel 105L and the right rear wheel 105R.

The rear differential device 116 is housed in a differential carrier 116c. In addition, an oil temperature sensor 309 for detecting temperature of differential oil used for lubricating each gear of the rear differential device 116 is also arranged in the differential carrier 116c. An electrical signal corresponding to the temperature of the differential oil is provided from the oil temperature sensor 309 to the control device 3.

A ring gear 116b is relatively non-rotatably provided on an outer peripheral portion of a differential case 116a of the rear differential device 116. The ring gear 116b is engaged with a gear portion 115a of the pinion gear shaft 115 and transmits torque from the pinion gear shaft 115 to the differential case 116a. The ring gear 116b and the gear portion 115a are, e.g., a hypoid gear.

Meanwhile, the driving force transmission system 110 has drive shafts 112L and 112R respectively coupled to a pair of side gears of the front differential device 112 and drive shafts 116L and 116R respectively coupled to a pair of side gears of the rear differential device 116. The drive shafts 112L and 112R transmit torque to the left front wheel 104L and the right front wheel 104R while the drive shafts 116L and 116R transmit torque to the left rear wheel 105L and the right rear wheel 105R.

Among the components of the above-mentioned driving force transmission system 110, the second gear mechanism 113, the propeller shaft 114, the pinion gear shaft 115, the rear differential device 116 and the drive shafts 116L and 116R are examples of driving force transmission members which transmit a driving force of the engine 101 to the rear wheels 105.

In the driving force transmission system 110 configured as described above, torque output from the transmission 103 is transmitted to the left front wheel 104L and the right front wheel 104R on a constant basis. Meanwhile, torque is transmitted to the left rear wheel 105L and the right rear wheel 105R at the time of need by operation of the driving force transmission device 2 depending on a running condition of the four-wheel drive vehicle 100. In other words, in the four-wheel drive vehicle 100 of the present embodiment, the left front wheel 104L and the right front wheel 104R are main drive wheels, and the left rear wheel 105L and the right rear wheel 105R are auxiliary drive wheels.

(Structure of Control Device)

The control device 3 constituting the driving force distribution controller 1 is provided with a storage unit 31 having a storage element such as ROM or RAM, a control unit 32 comprising an arithmetic processing unit such as CPU, and a power output circuit 33 controlled by the control unit 32. The control device 3 is configured that the control unit 32 executes a program stored in the storage unit 31 and thereby functions as examples of "a first control means" as well as "a second control means" of the invention. In other words, the control device 3 has the first control means and the second control means.

In more detail, the control unit 32 now as an example of the first control means calculates a value of torque to be transmitted to the rear wheels 105 according to a running condition of the four-wheel drive vehicle 100. Then, the control unit 32 now as an example of the second control means determines the torque value, which is calculated by itself as the first control means, as a command torque value when a rotational speed of the engine 101 is not less than a first threshold value or when a vehicle speed is not more than a second threshold value, or reduces the torque value, which is calculated by itself as the first control means, to provide as the command torque value when the rotational speed of the engine 101 is lower than the first threshold value as well as when the vehicle speed is higher than the second threshold value. The operation of the control unit 32 will be described later.

By the power output circuit 33, an electric current corresponding to the command torque obtained by arithmetic processing in the control unit 32 is supplied to the driving force transmission device 2. The power output circuit 33 is, e.g., an inverter circuit which outputs an electric current supplied from a non-illustrated battery after adjusting the amount of the current by PWM (Pulse Width Modulation) control.

A detection signal is input to the control device 3 from each sensor: an engine speed sensor 301 for detecting a rotational speed (revolution per hour) of the engine 101; an accelerator position sensor 302 for detecting an accelerator opening degree (an amount of acceleration operation) according to an amount of depression of the accelerator pedal 121; a clutch operation amount sensor 303 for detecting a clutch operation amount corresponding to an amount of depression of the clutch pedal 123; and a shift position sensor 304 for detecting a position of the shift lever 124.

In addition, detection signals are input to the control device 3 from wheel speed sensors 305 to 308 which are provided respectively corresponding to the left front wheel 104L, the right front wheel 104R, the left rear wheel 105L and the right rear wheel 105R to detect a rotational speed of each wheel. Furthermore, a detection signal of an outside temperature sensor 310 for detecting outside temperature is input to the control device 3. The outside temperature sensor 310 is arranged, e.g., inside a front bumper (not shown) of the four-wheel drive vehicle 100.

The detection signals of the respective sensors 301 to 310 may be input to the control device 3 via a signal line connected to a sensor body or may be input to the control device 3 by communication through an in-vehicle network such as CAN (Controller Area Network).

(Structure of Driving Force Transmission Device)

By the driving force transmission device 2, the torque of the engine 101 input through the propeller shaft 114 is transmitted to the pinion gear shaft 115 and is distributed to the rear wheels 105, according to the transmission torque value obtained by the arithmetic processing in the control device 3.

Figure 2:
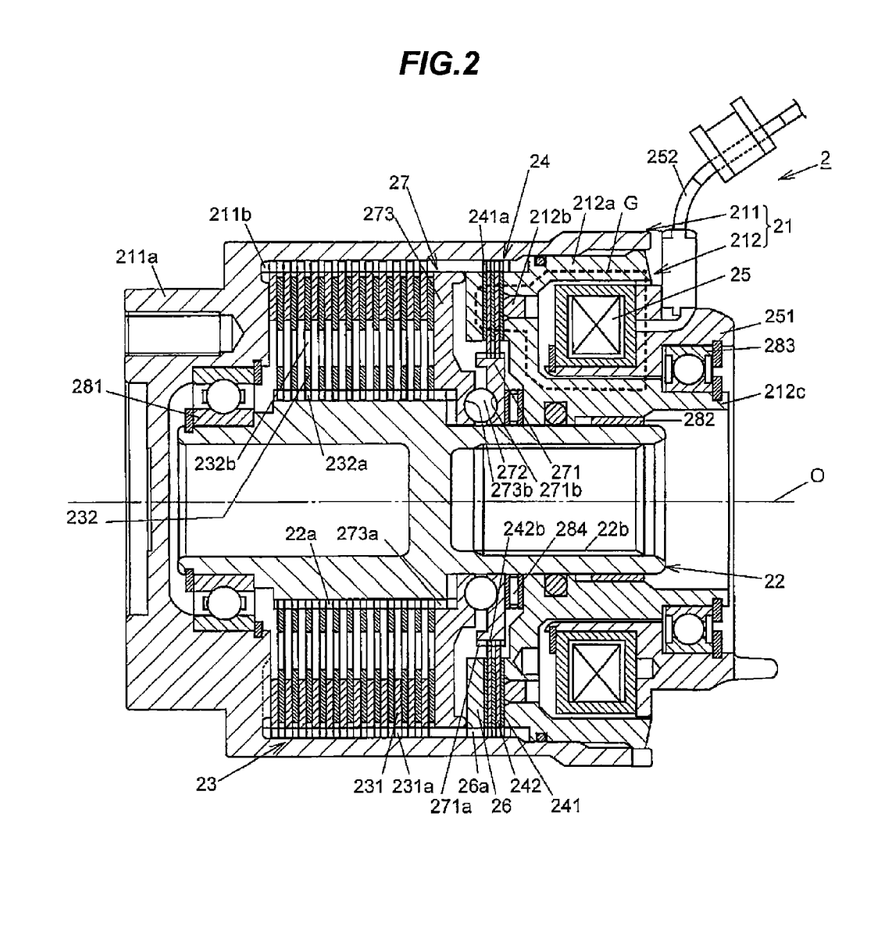
FIG. 2 is a cross sectional view showing a configuration example of a driving force transmission portion.

FIG. 2 is a cross sectional view showing a configuration example of the driving force transmission device 2. The driving force transmission device 2 has a rotation axis O and is generally composed of a housing 21 as an outer rotating member, a cylindrical inner shaft 22 as an inner rotating member relatively rotatable with respective to the housing 21, a main clutch 23 arranged between an inner peripheral surface of the housing 21 and an outer peripheral surface of the inner shaft 22, a pilot clutch 24 arranged in parallel to the main clutch 23 in an axial direction, an electromagnetic coil 25 and an armature 26 which apply a pressing force in an axial direction to the pilot clutch 24, and a cam mechanism 27 for converting a rotational force of the housing 21 transmitted by the pilot clutch 24 into a pressing force against the main clutch 23.

The housing 21 is composed of a bottomed cylindrical front housing 211 and an annular rear housing 212 coupled to the front housing 211 by screwing in, etc., so as to integrally rotate, and is supported rotatably around the rotation axis O as a central axis. Lubricant oil for lubrication between below-described respective clutch plates is filled in the housing 21.

The front housing 211 is formed of a non-magnetic material and has a bottom portion 211a to which the propeller shaft 114 (see FIG. 1) is relatively non-rotatably coupled via, e.g., a cross ferrule. In addition, plural spline teeth 211b provided along the rotation axis O are formed on an inner peripheral surface of the front housing 211.

The rear housing 212 is composed of a first member 212a formed of a magnetic material and coupled to the front housing 211, a second member 212b formed of a non-magnetic material and integrally coupled to an inner periphery of the first member 212a by welding, etc., and a third member 212c formed of a magnetic material and integrally coupled to an inner periphery of the second member 212b by welding, etc.

The inner shaft 22 is supported on an inner periphery of the housing 21 by a ball bearing 281 and a needle roller bearing 282. Plural spline teeth 22a provided along the rotation axis O are formed on an outer peripheral surface of the inner shaft 22. In addition, plural spline teeth 22b for relatively non-rotatably coupling an end portion of the pinion gear shaft 115 (see FIG. 1) are formed on an inner peripheral surface of the inner shaft 22.

The main clutch 23 is a multiplate wet clutch having plural outer clutch plates 231 and plural inner clutch plates 232 which are alternately arranged along the rotation axis O. Plural protrusions 231a fitted to the plural spline teeth 211b of the front housing 211 are provided on outer peripheral portions of the outer clutch plates 231. Meanwhile, plural protrusions 232a fitted to the plural spline teeth 22a of the inner shaft 22 are provided on inner peripheral portions of the inner clutch plates 232.

The outer clutch plates 231 are relatively non-rotatable with respect to the front housing 211 and are movable in the axial direction. The inner clutch plates 232 are relatively non-rotatable with respect to the inner shaft 22 and are movable in the axial direction. In addition, plural oil holes 232b are formed on the inner clutch plates 232 so that the lubricant oil can flow when the main clutch 23 is pressed in the axial direction.

The pilot clutch 24 is a multiplate wet clutch having plural outer clutch plates 241 and plural inner clutch plates 242 which are alternately arranged along the rotation axis O. Plural protrusions 241a fitted to the plural spline teeth 211b of the front housing 211 are provided on outer peripheral portions of the outer clutch plates 241. Meanwhile, plural protrusions 242b fitted to plural spline teeth 271a of a pilot cam 271 of the blow-described cam mechanism 27 are provided on inner peripheral portions of the inner clutch plates 242.

The outer clutch plates 241 are relatively non-rotatable with respect to the front housing 211 and are movable in the axial direction. In addition, the inner clutch plates 242 are relatively non-rotatable with respect to the pilot cam 271 and are movable in the axial direction.

The cam mechanism 27 is composed of the pilot cam 271, a main cam 273 for pushing the main clutch 23 in the axial direction, and plural spherical cam balls 272 arranged between the pilot cam 271 and the main cam 273.

The main cam 273 is restricted from relatively rotating with respect to the inner shaft 22 by engagement between spline teeth 273a formed on the inner periphery thereof and the plural spline teeth 22a of the inner shaft 22.

A thrust needle roller bearing 284 is arranged between the pilot cam 271 and the third member 212c of the rear housing 212 to restrict the pilot cam 271 from moving toward the rear housing 212.

On facing surfaces of the pilot cam 271 and the main cam 273, plural cam grooves 271b and 273b are formed along a circumferential direction so that an axial depth thereof varies. By rolling motion of the cam balls 272 in the cam grooves, the cam mechanism 27 generates an axial thrust force to press the main cam 273 against the main clutch 23.

The electromagnetic coil 25 is held by an annular yoke 251 formed of a magnetic material and is arranged on the rear housing 212 on the opposite side to the pilot clutch 24. The yoke 251 is supported on the third member 212c by a ball bearing 283 such that the outer peripheral surface thereof faces the inner peripheral surface of the first member 212a. And also, the inner peripheral surface of the yoke 251 faces the outer peripheral surface of the third member 212c. An excitation current is supplied to the electromagnetic coil 25 from the power output circuit 33 (see FIG. 1) of the control device 3 through an electric wire 252.

The armature 26 is formed of an annular magnetic material and is arranged axially movable so as to face the outer clutch plate 241 of the pilot clutch 24 while sandwiching the pilot clutch 24 between itself and the rear housing 212. Plural spline teeth 26a fitted to the plural spline teeth 211b of the front housing 211 are provided on an outer peripheral surface of the armature 26.

In the driving force transmission device 2 configured as described above, magnetic flux is generated in a magnetic path G passing through the yoke 251, the first member 212a and the third member 212c of the rear housing 212, the pilot clutch 24 and the armature 26 when the excitation current is supplied to the electromagnetic coil 25 from the control device 3. Then, the armature 26 is attracted toward the rear housing 212 by a magnetic force of the magnetic flux and thereby presses the pilot clutch 24.

This causes frictional sliding between the outer clutch plates 241 and the inner clutch plates 242 of the pilot clutch 24, a rotational force of the housing 21 is then transmitted to the pilot cam 271 of the cam mechanism 27 via the pilot clutch 24, and the pilot cam 271 thereby relatively rotates with respect to the main cam 273. The relative rotation between the pilot cam 271 and the main cam 273 causes the rolling motion of the cam balls 272 in the cam grooves 271b and 273b, thereby generating a thrust force in the axial direction which is a direction to separate the pilot cam 271 from the main cam 273. Then, due to the thrust force of the cam mechanism 27, the main clutch 23 is pressed by the main cam 273.

The rotational force transmitted to the pilot cam 271 by the frictional sliding of the pilot clutch 24 varies according to the amount of the excitation current supplied to the electromagnetic coil 25. Therefore, a pressing force of the main cam 273 to press the main clutch 23 can be varied by increasing or decreasing the excitation current and eventually it is possible to adjust the torque transmitted from the housing 21 to the inner shaft 22 via the main clutch 23, i.e., the transmission torque from the propeller shaft 114 toward the pinion gear shaft 115 (see FIG. 1).

(Operation of Control Device)

The control device 3 adjusts the excitation current supplied to the electromagnetic coil 25, thereby controlling a torque transmission amount by the driving force transmission device 2. The control device 3 has a normal control function of calculating a value of torque to be transmitted to the rear wheels 105 based on a rotational speed difference between the front and rear wheels and an amount of acceleration operation by the driver, and a correction function of performing correction so that the torque value calculated in a process of the normal control function is reduced when the rotational speed of the engine 101 is lower than a predetermined value as well as when the vehicle speed is higher than a predetermined value. The normal control function is realized by the previously mentioned first control means and the correction function is realized by the previously mentioned second control means. In addition, the excitation current corresponding to the calculated or corrected torque value is supplied to the electromagnetic coil 25 of the driving force transmission device 2 by the power output circuit 33 of the control device 3.

(Normal Control Function)

By the operation according to the program stored in the storage unit 31, the control unit 32 of the control device 3 calculates a rotational speed Vf of the front wheels 104 by averaging a detection value from the wheel speed sensor 305 provided on the left front wheel to detect the rotational speed of the left front wheel 104L and a detection value from the wheel speed sensor 306 provided on the right front wheel to detect the rotational speed of the right front wheel 104R, and also calculates a rotational speed Vr of the rear wheels 105 by averaging a detection value from the wheel speed sensor 307 provided on the left rear wheel to detect the rotational speed of the left rear wheel 105L and a detection value from the wheel speed sensor 308 provided on the right rear wheel to detect the rotational speed of the right rear wheel 105R. Then, a rotational speed difference ΔV between the front and rear wheels is obtained by subtracting the rotational speed Vr of the rear wheels 105 from the rotational speed Vf of the front wheels 104 (ΔV=Vf−Vr).

Figure 3A:
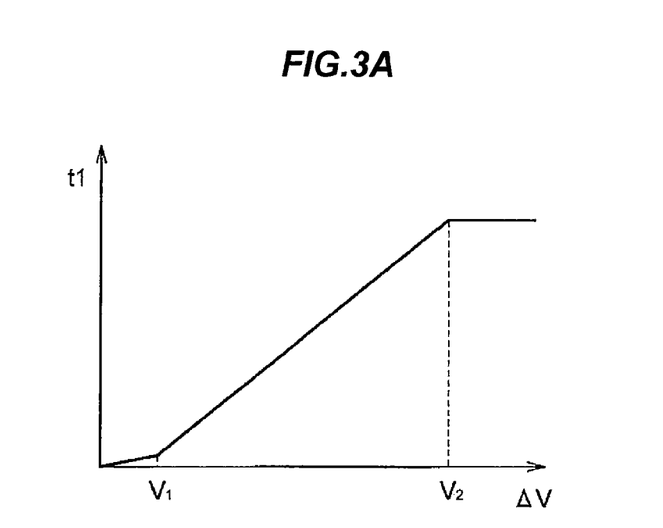
FIG. 3A is a graph showing an example of a relation between a rotational speed difference between front and rear wheels and a first torque t1.

FIG. 3A is a graph showing an example of a relation between the rotational speed difference ΔV and the first torque t1 based on the rotational speed difference ΔV. Information in, e.g., map format which indicates a relation between the rotational speed difference ΔV and the first torque t1 is stored in the storage unit 31 of the control device 3 and the control unit 32 derives the first torque t1 corresponding to the rotational speed difference ΔV by referring to this information.

In the present embodiment, the first torque t1 gradually increases with an increase in the rotational speed difference ΔV in a region in which the rotational speed difference ΔV is a small rotational speed difference of less than $V_1$, as shown in FIG. 3A. In a region in which the rotational speed difference ΔV is a moderate rotational speed difference of not less than $V_1$ and less than $V_2$, the first torque t1 increases more sharply with an increase in the rotational speed difference ΔV than the region of the small rotational speed difference. Then, the first torque t1 is constant in a region in which the rotational speed difference ΔV is a large rotational speed difference of not less than $V_2$.

When, for example, the front wheel 104 slips, increasing the first torque t1 with an increase in the rotational speed difference ΔV allows the more driving force of the engine 101 to be distributed to the rear wheels 105, thereby suppressing slipping of the front wheel 104.

In addition, based on a detected value of the accelerator position sensor 302 provided corresponding to the accelerator pedal 121, the control unit 32 detects an accelerator opening degree φ resulting from the operation by the driver and then derives the second torque t2 corresponding to the accelerator opening degree φ.

Figure 3B:
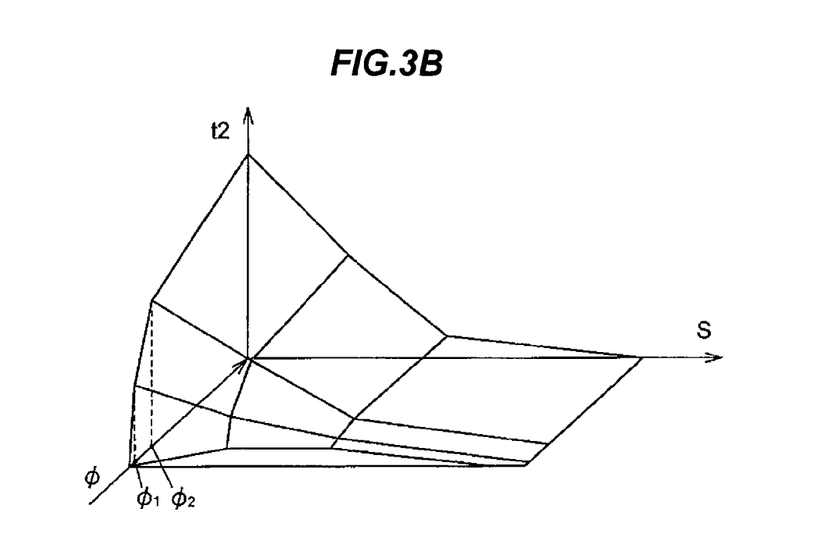
FIG. 3B is a graph showing an example of a relation between an accelerator opening degree and a second torque t2.

FIG. 3B is a graph showing an example of a relation between the accelerator opening degree φ and the second torque t2 based on the accelerator opening degree φ. In the present embodiment, a vehicle speed S is added to the accelerator opening degree φ and the graph in FIG. B shows a relation between the accelerator opening degree φ plus the vehicle speed S and the second torque t2. Information in, e.g., map format which indicates a relation between the accelerator opening degree φ plus the vehicle speed S and the second torque t2 is stored in the storage unit 31 of the control device 3 and the control unit 32 derives the second torque t2 corresponding to the accelerator opening degree φ plus the vehicle speed S by referring to this information. The vehicle speed S can be obtained by, e.g., multiplying an average value of the rotational speed Vf of the front wheels 104 and the rotational speed Vr of the rear wheels 105 by a predetermined coefficient.

As shown in FIG. 3B, the second torque t2 increases relatively sharply with an increase in the accelerator opening degree φ in a region in which the accelerator opening degree φ is a small accelerator opening degree of less than $φ_1$. In a region in which the accelerator opening degree φ is a moderate accelerator opening degree of not less than $φ_1$ and less than $φ_2$, the second torque t2 increases more gradually with an increase in the accelerator opening degree p than in the region of the small accelerator opening degree. Then, in a region in which the accelerator opening degree p is a large accelerator opening degree of not less than $φ_2$, the second torque t2 increases more gradually with an increase in the accelerator opening degree φ than in the region of the moderate accelerator opening degree. In addition, the second torque t2 is set to decrease with an increase in the vehicle speed S, as shown in FIG. 3B.

Increasing the second torque t2 with an increase in the accelerator opening degree φ allows, e.g., a large driving force of the engine 101 at the time of sudden acceleration to be evenly distributed to the front wheels 104 and the rear wheels 105 and it is thus possible to avoid slipping of the front wheels 104 which may occur when the driving force is concentrated on the front wheels 104.

The control unit 32 of the control device 3 calculates the sum of the first torque t1 and the second torque t2 to obtain a command torque tc (tc=t1+t2). Then, the control unit 32 controls the power output circuit 33 so that an electric current corresponding to the command torque tc is supplied as an excitation current to the electromagnetic coil 25 of the driving force transmission device 2.

(Correction Function)

The control unit 32 also has the correction function of correcting the command torque tc obtained as described above, based on a rotational speed Ve of the engine 101 and the vehicle speed S. In the correction function, the command torque tc calculated in the normal control function based on the rotational speed difference ΔV between the front and rear wheels and the accelerator opening degree φ is reduced when the rotational speed Ve of the engine 101 is lower than a predetermined value (a first threshold value $SH_1$) as well as when the vehicle speed S is higher than a predetermined value (a second threshold value $SH_2$).

A running condition which causes the control device 3 to reduce the command torque tc is the case where an excessive torque in the direction of deceleration could be generated in the driving force transmission system 110 when the clutch 102 is frictionally engaged by an operation of the driver in a state that the driving force of the engine 101 is not transmitted to the driving force transmission system 110.

In more detail, it is the case where an excessive torque in the direction of deceleration could be generated in the driving force transmission system 110 if, in a state in which the transmission 103 is in neutral or torque transmission by the clutch 102 is interrupted during running, a low gear (the 1$^{st}$ speed: the gear with the highest gear ratio) of the transmission 103 is selected by operating the shift lever 124 and then the driving force transmission system 110 and the engine 101 are coupled so as to allow a driving force to be transmitted.

The control device 3 detects such a running condition based on the rotational speed Ve of the engine 101 and the vehicle speed S. The first threshold value $SH_1$ to be compared with the rotational speed Ve of the engine 101 can be set to, e.g., 1000 to 2000 rpm (revolution per minute). Meanwhile, the second threshold value $SH_2$ to be compared with the vehicle speed S can be set to, e.g., 10 to 20 km/h.

The first threshold value $SH_1$ is set to a value smaller than the rotational speed of the engine 101 when the four-wheel drive vehicle 100 travels at a vehicle speed as the second threshold value $SH_2$ in a state that the transmission 103 is shifted into low gear and the clutch 102 is frictionally engaged. In addition, the first threshold value $SH_1$ may be a predetermined fixed value or may be a value which varies in response to the vehicle speed S.

When the control unit 32 of the control device 3 detects that the rotational speed Ve of the engine 101 is lower than the first threshold value $SH_1$ and also the vehicle speed S is higher than the second threshold value $SH_2$, the control unit 32 performs correction to reduce the command torque tc and supplies an electric current as an excitation current corresponding to the corrected command torque tc to the electromagnetic coil 25 of the driving force transmission device 2.

The correction may be performed so that the product obtained by multiplying the command torque tc by a coefficient k of less than 1 is determined as the corrected command torque tc (the corrected command torque tc=the command torque tc before correction x the coefficient k (0<k<1)), or so that the command torque tc is replaced with a predetermined given torque value.

When the corrected command torque tc is obtained by multiplying the command torque tc by the coefficient k, it is preferable that the coefficient k be, e.g., not more than 0.8, and more desirably, not more than 0.5. Meanwhile, when the command torque tc is replaced with a predetermined given torque value, the predetermined given torque value should be, e.g., not more than 80%, more desirably 50%, of the maximum torque transmission capacity of the driving force transmission device 2.

In addition, in the present embodiment, the higher the differential oil temperature in the differential device 116 detected by the oil temperature sensor 309 arranged in the differential carrier 116c, the less the reduction amount of the command torque tc. In more detail, the reduction amount of the command torque tc by the above-mentioned correction (a difference in the command torque tc before and after the correction) is re-corrected based on the differential oil temperature detected by the oil temperature sensor 309 so that the reduction amount of the command torque tc decreases with an increase in the temperature.

Furthermore, in the present embodiment, the higher the outside temperature detected by the outside temperature sensor 310, the less the reduction amount of the command torque tc. In more detail, the reduction amount of the command torque tc by the above-mentioned correction (a difference in the command torque tc before and after the correction) is re-corrected based on the outside temperature detected by the outside temperature sensor 310 so that the reduction amount of the command torque tc is decreased with an increase in the outside temperature.

A process of re-correcting the reduction amount of the command torque based on the detected value of the oil temperature sensor 309 or the outside temperature sensor 310 can be performed such that a value obtained by, e.g., multiplying the reduction amount of the command torque tc before the re-correction by a coefficient of less than 1 varying according to temperature is determined as the re-corrected command torque tc.

In addition, the control device 3 continuously controls correction to reduce the corrected command torque tc when the rotational speed Ve of the engine 101 is lower than the first threshold value $SH_1$ as well as when the vehicle speed S is higher than the second threshold value $SH_2$, and suspends the process of reduction correction when the rotational speed Ve of the engine 101 is not less than first threshold value $SH_1$ or when the vehicle speed S is not more than the second threshold value $SH_2$.

(Processing of Control Unit)

Figure 4:
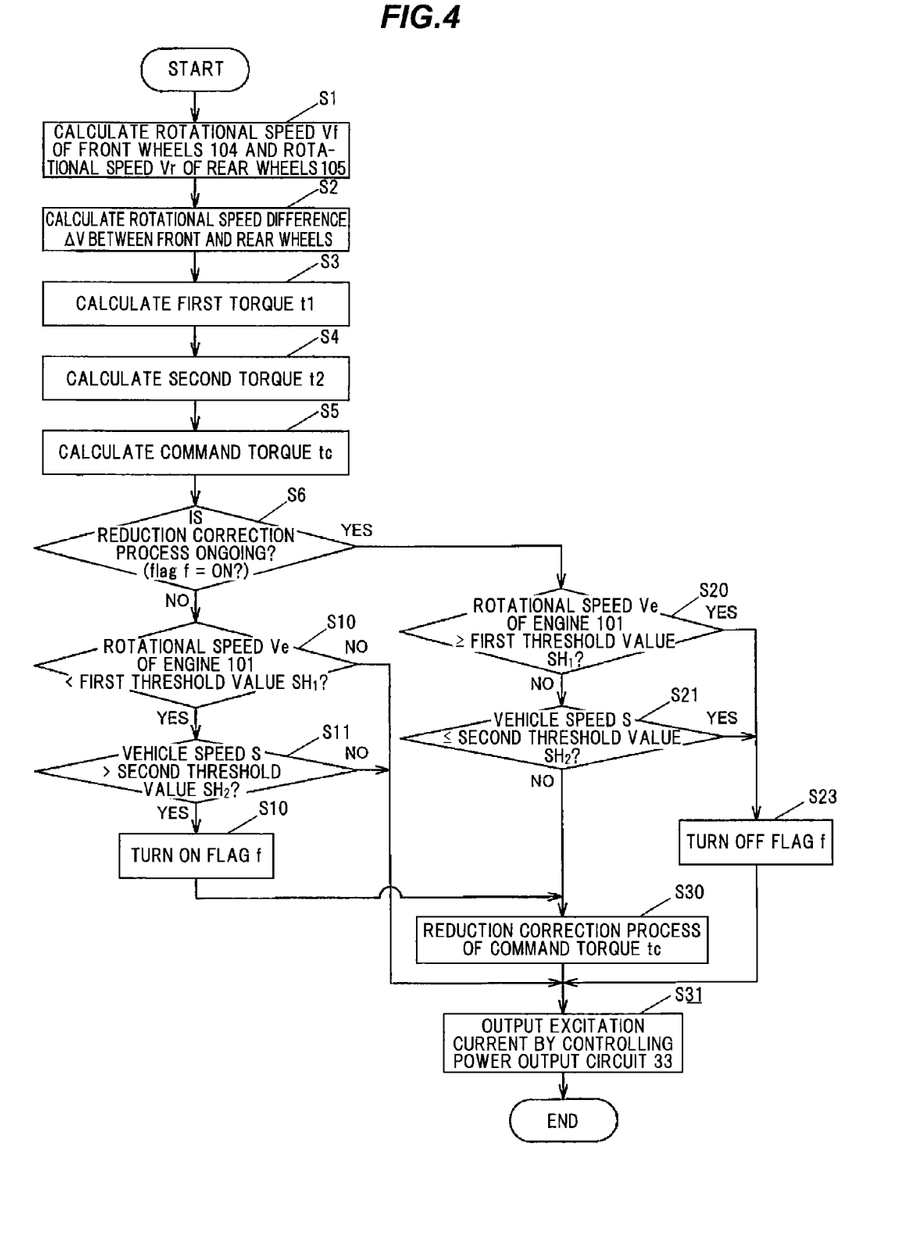
FIG. 4 is a flow chart showing an example of a process executed by a control unit of a control device.

FIG. 4 is a flow chart showing an example of a process executed by the control unit 32 of the control device 3. The control unit 32 repeatedly executes the process shown in the flow chart at every predetermined control cycle (e.g., every 100 ms).

Firstly, the control unit 32 calculates the rotational speed Vf of the front wheels 104 and the rotational speed Vr of the rear wheels 105 by referring to the detected values of the wheel speed sensors 305 to 308 (S1). Then, the rotational speed difference ΔV between front and rear wheels is calculated based on the rotational speed Vf of the front wheels 104 and the rotational speed Vr of the rear wheels 105 (S2).

Next, the control unit 32 calculates the first torque t1 corresponding to the rotational speed difference ΔV by referring to a torque map stored in the storage unit 31 (S3). In addition, the control unit 32 detects the accelerator opening degree ϕ based on the detected value of the accelerator position sensor 302 and calculates the second torque t2 corresponding to the accelerator opening degree ϕ by referring to the torque map stored in the storage unit 31 (S4). Then, the control unit 32 derives the command torque tc as a value of torque to be transmitted to the rear wheels 105 by adding the first torque t1 and the second torque t2 (S5).

Next, by referring to a flag f indicating that the reduction correction process is ongoing, the control unit 32 determines whether or not the reduction correction process is ongoing (S6). The control unit 32 executes the processes of the below-described step S10 and onward when the reduction correction process is not ongoing (the off-state of the flag f), and executes the processes of the below-described step S20 and onward when the reduction correction process is ongoing (the on-state of the flag f). Note that, the flag f is initialized into the off-state when starting the engine 101.

In the off-state of the flag f (S6: No), the control unit 32 derives the rotational speed Ve of the engine 101 based on the detected value of the engine speed sensor 301 and then determines whether or not the rotational speed Ve of the engine 101 is lower than the first threshold value $SH_1$ (S10). If the rotational speed Ve is lower than the first threshold value $SH_1$ (S10: Yes), the control unit 32 determines whether or not the vehicle speed S is higher than the second threshold value $SH_2$ (S11).

If the vehicle speed S is higher than the second threshold value $SH_2$ (S11: Yes), the control unit 32 turns on the flag f which indicates that the reduction correction process is ongoing (S13), and then performs the reduction correction process of reducing the command torque tc obtained in Step S5 (S30). In other words, Steps S10 and S11 show transition conditions to shift to the reduction correction processing mode in which the command torque tc is reduced.

Then, the control unit 32 controls the power output circuit 33 according to the corrected command torque tc so that an excitation current which is increased with an increase in the command torque tc is output to the electromagnetic coil 25 of the driving force transmission device 2 (S31).

On the other hand, in the on-state of the flag f (S6: Yes), the control unit 32 derives the rotational speed Ve of the engine 101 based on the detected value of the engine speed sensor 301 and then determines whether or not the rotational speed Ve of the engine 101 is not less than the first threshold value $SH_1$ (S20). If the rotational speed Ve is less than the first threshold value $SH_1$ (S21: No), the control unit 32 determines whether or not the vehicle speed S is not more than the second threshold value $SH_2$ (S21). If the vehicle speed S is not more than the second threshold value $SH_2$ (S21: No), the control unit 32 performs the reduction correction process of reducing the command torque tc obtained in Step S5 (S30) and outputs an excitation current corresponding to the corrected command torque tc (S31).

On the other hand, when the rotational speed Ve of the engine 101 is not less than the first threshold value $SH_1$ (S20: Yes) or when the vehicle speed S is not more than the second threshold value $SH_2$ (S21: Yes), the control unit 32 turns off the flag f which indicates that the reduction correction process is ongoing (S23) and controls the power output circuit 33 so that an excitation current corresponding to the command torque tc obtained in Step S5 is output to the electromagnetic coil 25 of the driving force transmission device 2 (S31). In other words, Steps S20 and S21 show cancellation conditions to cancel the reduction correction processing mode.

Functions and Effects of the First Embodiment

In the first embodiment described above, when the rotational speed Ve of the engine 101 is lower than the first threshold value $SH_1$ as well as when the vehicle speed S is higher than the second threshold value $SH_2$, the command torque tc calculated based on the rotational speed difference $\Delta V$ between the front and rear wheels and the accelerator opening degree $\phi$ is reduced. Therefore, it is possible to reduce torque in the direction of deceleration which is generated in the driving force transmission system 110 when, e.g., the driver selects a low gear and the clutch 102 is suddenly connected. As a result, it is possible to reduce the maximum value of the torque in the direction of deceleration which could be generated in the driving force transmission member, such as the propeller shaft 114 or rear differential device 116, for transmitting a driving force to the rear wheels 105.

In addition, in the driving force transmission device 2, the magnetic flux in the magnetic path G varies due to an increase or decrease in a drive current, this varies a pressing force of the armature 26 toward the pilot clutch 24, a thrust force generated by the cam mechanism 27 varies due to variation in torque transmitted via the pilot clutch 24, a force of the main cam 273 of the cam mechanism 27 to press the main clutch 23 then varies and transmission torque between the propeller shaft 114 and the pinion gear shaft 115 is adjusted, which results in that transmission torque is adjusted with time delay after the increase or decrease in the drive current. This could generate large torque in the direction of deceleration in the driving force transmission system 110 even if the driver operates to select a low gear and the excitation current is reduced after frictionally engaging the clutch 102. However, according to the present embodiment, since the transmission torque of the driving force transmission device 2 is reduced before the engine 101 and the driving force transmission system 110 are coupled so as to allow the driving force to be transmitted, the torque in the direction of deceleration generated in the driving force transmission system 110 can be reduced more surely.

Furthermore, in the present embodiment, the higher the differential oil temperature detected by the oil temperature sensor 309 arranged in the differential carrier 116c or the higher the outside temperature detected by the outside temperature sensor 310, the less the reduction amount of the command torque tc. Therefore, it is possible to more appropriately correct the command torque, taking into consideration that viscosity of the lubricant oil in the housing 21 of the driving force transmission device 2 varies depending on the temperature. That is, the high temperature reduces viscosity of the lubricant oil present between the inner clutch plates 232 and the outer clutch plates 231 of the main clutch 23 and between the inner clutch plates 242 and the outer clutch plates 241 of the pilot clutch 24 and this could cause excessive reduction of the command torque. However, in the present embodiment, such a problem can be avoided since the reduction amount of the command torque tc is decreased based on the temperature detected by the oil temperature sensor 309 and the outside temperature sensor 310.

Although, in the present embodiment, the oil temperature sensor 309 and the outside temperature sensor 310 are used to estimate the temperature of the lubricant oil in the driving force transmission device 2, the reduction amount of the command torque tc may be decreased based on either the oil temperature sensor 309 or the outside temperature sensor 310. In addition, the temperature of the lubricant oil in the driving force transmission device 2 may be estimated by another sensor or method. For example, a temperature sensor may be provided on the yoke 251 as a non-rotating portion of the driving force transmission device 2 so that the reduction amount of the command torque tc is decreased with an increase in the detected temperature. Alternatively, the temperature of the lubricant oil in the driving force transmission device 2 may be estimated by calculation based on the rotational speed difference $\Delta V$ between the front and rear wheels and the excitation current supplied to the electromagnetic coil 25 of the driving force transmission device 2.

Second Embodiment

Next, the second embodiment of the invention will be described in reference to FIG. 5. The present embodiment is common with the first embodiment in the configuration of the four-wheel drive vehicle 100 but is different from the first embodiment in details of the process executed by the control unit 32 of the control device 3.

Figure 5:
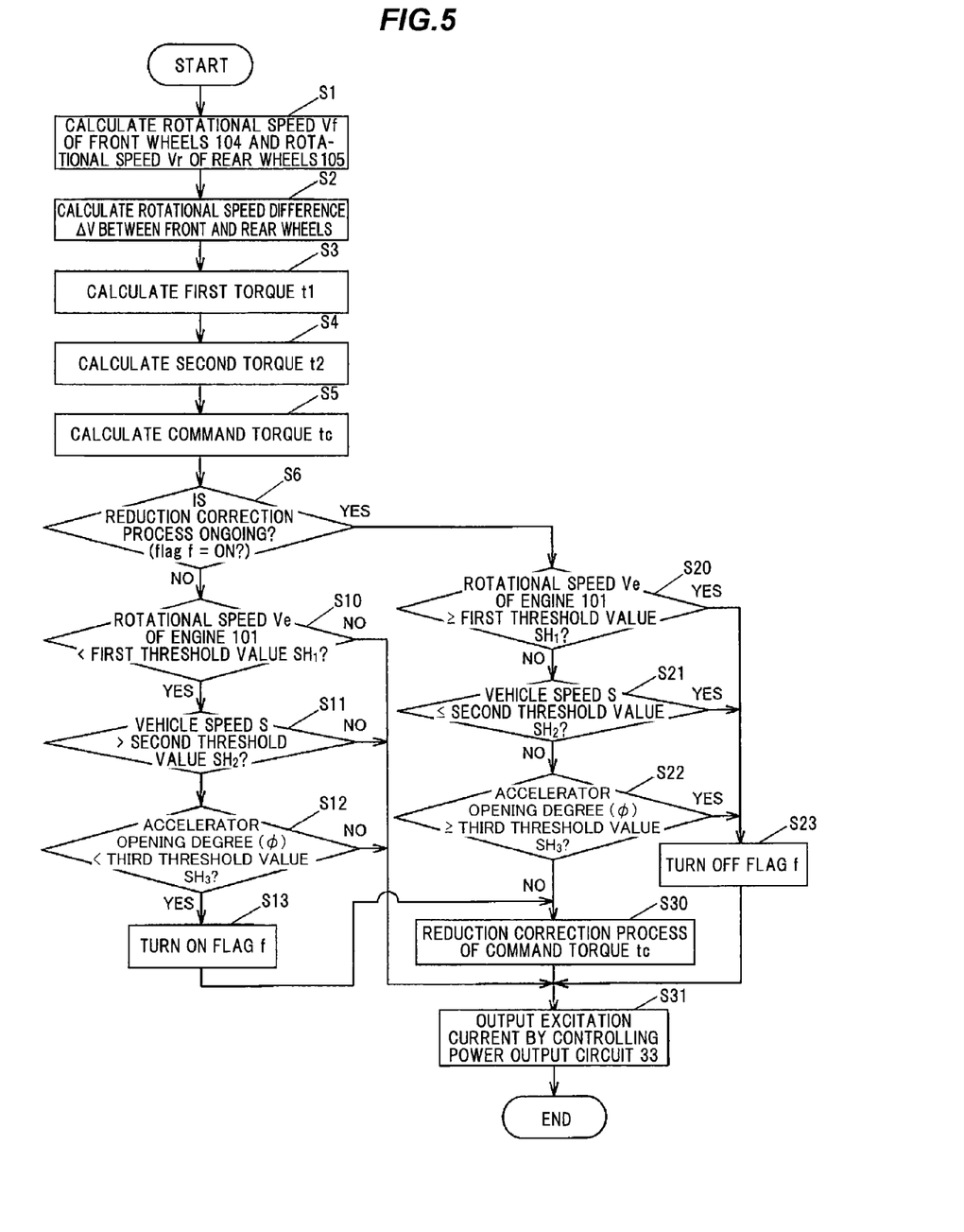
FIG. 5 is a flow chart showing an example of a process executed by a control unit in a second embodiment of the invention.

FIG. 5 is a flow chart showing an example of a process executed by the control unit 32 in the second embodiment of the invention. In FIG. 5, steps with the same process details as those in the flow chart shown in FIG. 4 are denoted by the same step numbers and explanation thereof will be omitted.

As shown in FIG. 5, the control unit 32 in the present embodiment determines whether or not the accelerator opening degree $\phi$ based on the detected value of the accelerator position sensor 302 is smaller than a predetermined value (a third threshold value $SH_3$) when the rotational speed Ve of engine 101 is lower than the first threshold value $SH_1$ (S10: Yes) as well as when the vehicle speed S is higher than the second threshold value $SH_2$ (S11: Yes). The third threshold value $SH_3$ can be set to, e.g., a value which is 1 to 20% of the accelerator opening degree during full throttle.

Then, when the accelerator opening degree $\phi$ is smaller than the third threshold value $SH_3$ (S12: Yes), the control unit 32 turns on the flag f (S13) and then performs the reduction correction process (S30). In other words, Steps S10 to S12 show transition conditions to shift to the reduction correction processing mode in the present embodiment.

Meanwhile, in case that the flag f is on (in the reduction correction processing mode) and when the rotational speed Ve of the engine 101 is less than first threshold value $SH_1$ (S20: No) as well as when the vehicle speed S is more than the second threshold value $SH_2$ (S21: No), the control unit 32 determines whether or not the accelerator opening degree $\phi$ is not less than third threshold value $SH_3$ (S22).

If the accelerator opening degree $\phi$ is not less than third threshold value $SH_3$ (S22: Yes), the flag f is turned off (S23) and an excitation current corresponding to the command torque tc obtained in Step S5 is output to the electromagnetic coil 25 of the driving force transmission device 2 (S31). In other words, Steps S20 to S22 show cancellation conditions to cancel the reduction correction processing mode in the present embodiment.

On the other hand, if the accelerator opening degree φ is less than third threshold value $SH_3$ (S22: No), the reduction correction process of reducing the command torque tc is performed (S30) and an excitation current corresponding to the corrected command torque tc is output (S31).

Functions and Effects of the Second Embodiment

According to the second embodiment described above, in addition to the functions and effects of the first embodiment, the correction to reduce the command torque tc is not performed when, for example, the driver depresses the accelerator pedal 121 before downshifting to increase the rotational speed of the engine 101 since the command torque tc is reduced only when the accelerator opening degree φ is less than the third threshold value $SH_3$. Therefore, a higher proportion of the driving force is also distributed to the rear wheels 105, which allows stable acceleration.

Other Embodiments

Although the driving force distribution controller and the four-wheel drive vehicle of the invention have been described based on the above-mentioned embodiment, the invention is not intended to be limited to the embodiments and can be implemented in various forms without departing from the gist of the invention.

For example, the case of shifting to the reduction correction processing mode when the conditions of Steps S10 and S11 (see FIG. 4) or Steps S10 to S12 (see FIG. 5) are satisfied have been described in each of the above-mentioned embodiments, other conditions may be added to these conditions. In addition, the above-mentioned other conditions may be such that, e.g., the operation amount (the amount of depression) of the clutch pedal 123 detected based on the clutch operation amount sensor 303 is not less than a predetermined value and the clutch 102 does not actually transmit the driving force. Alternatively, a condition that the transmission 103 is in a neutral mode based on the detected value of the shift position sensor 304 may be added as the above-mentioned other conditions. In this case, it is possible to perform the correction to reduce the command torque tc at more suitable timing.

In addition, although the case where the front wheels 104 are main drive wheels and the rear wheels 105 are auxiliary drive wheels has been described in each of the above-mentioned embodiments, it may be the other way around such that the front wheels 104 are auxiliary drive wheels and the rear wheels 105 are main drive wheels.

In addition, although in each of the above-mentioned embodiments, the command torque tc is calculated by adding the second torque t2 based on the accelerator opening degree φ to the first torque t1 based on the rotational speed difference ΔV between the front wheels 104 and the rear wheels 105, the command torque tc can be calculated based on at least the first torque t1. In other words, the control unit 32 of the control device 3 may calculate, as the first control means, the command torque tc based on only the first torque t1.

In addition, although in each of the above-mentioned embodiments, the rotational speed Ve of the engine 101 is obtained based on the detected value of the engine speed sensor 301, it is not limited thereto. The rotational speed Ve of the engine 101 may be obtained based on, e.g., a gear ratio of the gear position based on the vehicle speed S and the detected value of the shift position sensor 304.

In addition, although the case where the four-wheel drive vehicle 100 is a so-called manual transmission vehicle mounting a manual gearbox (manual transmission) has been described in each of the above-mentioned embodiments, the invention may be applied to a so-called automatic transmission car mounting an automatic gearbox (automatic transmission) as long as it is a vehicle which allows the driver to downshift.

EXPLANATION OF REFERENCES

1: driving force distribution controller, 2: driving force transmission device, 3: control device, 21: housing, 22: inner shaft, 22a, 22b: spline teeth, 23: main clutch, 24: pilot clutch, 25: electromagnetic coil, 26: armature, 26a: spline teeth, 27: cam mechanism, 31: storage unit, 32: control unit, 33: power output circuit, 100: four-wheel drive vehicle, 101: engine, 102: clutch, 102a: first disk, 102b: second disk, 103: transmission, 104: front wheel, 104L: left front wheel, 104R: right front wheel, 105: rear wheel, 105L: left rear wheel, 105R: right rear wheel, 110: driving force transmission system, 111: gear mechanism, 112: front differential device, 112L, 112R: drive shaft, 112a: differential case, 113: gear mechanism, 114: propeller shaft, 115: pinion gear shaft, 115a: gear portion, 116: rear differential device, 116c: differential carrier, 116L, 116R: drive shaft, 116a: differential case, 116b: ring gear, 121: accelerator pedal, 122: brake pedal, 123: clutch pedal, 124: shift lever, 211: front housing, 211a: bottom portion, 211b: spline teeth, 212: rear housing, 212a: first member, 212b: second member, 212c: third member, 231: outer clutch plate, 231a: protrusion, 232: inner clutch plate, 232a: protrusion, 232b: oil hole, 241: outer clutch plate, 241a: protrusion, 242: inner clutch plate, 242b: protrusion, 251: yoke, 252: electric wire, 271: pilot cam, 271a: spline teeth, 271b, 273b: cam groove, 272: cam ball, 273: main cam, 273a: spline teeth, 281: ball bearing, 282: needle roller bearing, 283: ball bearing, 284: thrust needle roller bearing, 301: engine speed sensor, 302: accelerator position sensor, 303: clutch operation amount sensor, 304: shift position sensor, 305 to 308: wheel speed sensor, 309: oil temperature sensor, 310: outside temperature sensor, G: magnetic path, O: rotation axis

The invention claimed is:

1. A driving force distribution controller that is mounted on a four-wheel drive vehicle comprising an engine for generating a driving force, a gearbox for changing output speed of the engine, a clutch capable of interrupting torque transmission between the engine and the gearbox, and a driving force transmission system capable of transmitting an output of the gearbox to either front or rear wheels as main drive wheels and to other remaining wheels as auxiliary drive wheels, the driving force distribution controller comprising:
a control device that calculates a command torque value to be transmitted to the auxiliary drive wheels; and
a driving force transmission device that transmits torque corresponding to the command torque value to the auxiliary drive wheels,
wherein the control device comprises:
a first control means that calculates a torque value to be transmitted to the auxiliary drive wheels according to a running condition; and
a second control means that determines the torque value calculated by the first control means to be the command torque value when a rotational speed of the engine is not lower than a first threshold value or when a vehicle speed is not higher than a second threshold value, and that reduces the torque value calculated by the first control means and determines the reduced torque value to be the command torque value when the rotational speed of the engine is lower than the first threshold value and when the vehicle speed is higher than the second threshold value.

2. The driving force distribution controller according to claim 1, wherein the second control means reduces the torque value calculated by the first control means when the rotational speed of the engine is lower than the first threshold value, when the vehicle speed is higher than the second threshold value and when the amount of acceleration operation by a driver is smaller than a third threshold value.

3. The driving force distribution controller according to claim 2, wherein the front wheels comprise a left front wheel and a right front wheel, and the rear wheels comprise a left rear wheel and a right rear wheel,
the controller further comprising:
a wheel speed sensor for the left front wheel to detect a rotational speed of the left front wheel;
a wheel speed sensor for the right front wheel to detect a rotational speed of the right front wheel;
a wheel speed sensor for the left rear wheel to detect a rotational speed of the left rear wheel; and
a wheel speed sensor for the right rear wheel to detect a rotational speed of the right rear wheel,
wherein the rotational speed of the front wheels is calculated from an average of a detected value of the rotational speed of the left front wheel and that of the right front wheel,
wherein the rotational speed of the rear wheels is calculated from an average of a detected value of the rotational speed of the left rear wheel and that of the right rear wheel,
wherein a rotational speed difference is calculated by subtraction between the rotational speed of the front wheels and that of the rear wheels, and
wherein the first control means calculates a torque value to be transmitted to the auxiliary drive wheels based on at least the rotational speed difference.

4. The driving force distribution controller according to claim 3, mounted on the four-wheel drive vehicle that the front wheels are used as the main drive wheels and the rear wheels are used as the auxiliary drive wheels.

5. The driving force distribution controller according to claim 4, wherein the first threshold value is from 1000 to 2000 rpm and the second threshold value is from 10 to 20 km/h.

6. The driving force distribution controller according to claim 5, wherein the driving force transmission system comprises a differential device arranged between the driving force transmission device and the auxiliary drive wheels, and
wherein the control device decreases the reduction amount of the torque value according to an increase in temperature of differential oil in a differential carrier that houses the differential device.

7. The driving force distribution controller according to claim 6, wherein the control device decreases the reduction amount of the torque value according to an increase in outside temperature.

8. A four-wheel drive vehicle, comprising:
an engine for generating a driving force;
a gearbox for changing output speed of the engine;
a clutch capable of interrupting torque transmission between the engine and the gearbox;
a driving force transmission system capable of transmitting an output of the gearbox to either front or rear wheels as main drive wheels and to other remaining wheels as auxiliary drive wheels; and
the driving force distribution controller according to claim 7.

9. The driving force distribution controller according to claim 2, mounted on the four-wheel drive vehicle that the front wheels are used as the main drive wheels and the rear wheels are used as the auxiliary drive wheels.

10. The driving force distribution controller according to claim 2, wherein the first threshold value is from 1000 to 2000 rpm and the second threshold value is from 10 to 20 km/h.

11. The driving force distribution controller according to claim 2, wherein the driving force transmission system comprises a differential device arranged between the driving force transmission device and the auxiliary drive wheels, and
wherein the control device decreases the reduction amount of the torque value according to an increase in temperature of differential oil in a differential carrier that houses the differential device.

12. The driving force distribution controller according to claim 2, wherein the control device decreases the reduction amount of the torque value according to an increase in outside temperature.

13. A four-wheel drive vehicle, comprising:
an engine for generating a driving force;
a gearbox for changing output speed of the engine;
a clutch capable of interrupting torque transmission between the engine and the gearbox;
a driving force transmission system capable of transmitting an output of the gearbox to either front or rear wheels as main drive wheels and to other remaining wheels as auxiliary drive wheels; and
the driving force distribution controller according to claim 2.

14. The driving force distribution controller according to claim 3, wherein the first threshold value is from 1000 to 2000 rpm and the second threshold value is from 10 to 20 km/h.

15. The driving force distribution controller according to claim 1, wherein the front wheels comprise a left front wheel and a right front wheel, and the rear wheels comprise a left rear wheel and a right rear wheel,
the controller further comprising:
a wheel speed sensor for the left front wheel to detect a rotational speed of the left front wheel;
a wheel speed sensor for the right front wheel to detect a rotational speed of the right front wheel;
a wheel speed sensor for the left rear wheel to detect a rotational speed of the left rear wheel; and
a wheel speed sensor for the right rear wheel to detect a rotational speed of the right rear wheel,
wherein the rotational speed of the front wheels is calculated from an average of a detected value of the rotational speed of the left front wheel and that of the right front wheel,
wherein the rotational speed of the rear wheels is calculated from an average of a detected value of the rotational speed of the left rear wheel and that of the right rear wheel,
wherein a rotational speed difference is calculated by subtraction between the rotational speed of the front wheels and that of the rear wheels, and
wherein the first control means calculates a torque value to be transmitted to the auxiliary drive wheels based on at least the rotational speed difference.

16. The driving force distribution controller according to claim 1, mounted on the four-wheel drive vehicle that the front wheels are used as the main drive wheels and the rear wheels are used as the auxiliary drive wheels.

17. The driving force distribution controller according to claim 1, wherein the first threshold value is from 1000 to 2000 rpm and the second threshold value is from 10 to 20 km/h.

18. The driving force distribution controller according to claim 1, wherein the driving force transmission system comprises a differential device arranged between the driving force transmission device and the auxiliary drive wheels, and wherein the control device decreases the reduction amount of the torque value according to an increase in temperature of differential oil in a differential carrier that houses the differential device.

19. The driving force distribution controller according to claim 1, wherein the control device decreases the reduction amount of the torque value according to an increase in outside temperature.

20. A four-wheel drive vehicle, comprising:
an engine for generating a driving force;
a gearbox for changing output speed of the engine;
a clutch capable of interrupting torque transmission between the engine and the gearbox;
a driving force transmission system capable of transmitting an output of the gearbox to either front or rear wheels as main drive wheels and to other remaining wheels as auxiliary drive wheels; and
the driving force distribution controller according to claim 1.

* * * * *